United States Patent
Hund et al.

(10) Patent No.: US 10,132,039 B2
(45) Date of Patent: *Nov. 20, 2018

(54) PROCESS FOR MANUFACTURING PAPER USING A BASE COPOLYMER THAT HAS REACTED WITH AN ALDEHYDE AS A DRY STRENGTH, RETENTION, DRAINAGE AND RUNNABILITY AID

(71) Applicant: S.P.C.M. SA, Andrezieux-Boutheon (FR)

(72) Inventors: René Hund, Villars (FR); Cyril Barriere, Givors (FR)

(73) Assignee: S.P.C.M SA, Andrezieux-Boutheon (FR)

( * ) Notice: Subject to any disclaimer, the term of this patent is extended or adjusted under 35 U.S.C. 154(b) by 53 days.

This patent is subject to a terminal disclaimer.

(21) Appl. No.: 15/296,756

(22) Filed: Oct. 18, 2016

(65) Prior Publication Data

US 2017/0037575 A1    Feb. 9, 2017

Related U.S. Application Data

(63) Continuation of application No. 14/373,069, filed as application No. PCT/FR2013/050390 on Feb. 26, 2013, now Pat. No. 9,506,200.

(30) Foreign Application Priority Data

Feb. 27, 2012   (FR) ...................... 12 51740

(51) Int. Cl.
| | | |
|---|---|---|
| D21H 17/45 | (2006.01) |
| D21H 21/10 | (2006.01) |
| D21H 17/56 | (2006.01) |
| D21H 21/18 | (2006.01) |
| D21H 17/37 | (2006.01) |
| D21H 17/54 | (2006.01) |
| C08F 8/28 | (2006.01) |
| D21H 17/00 | (2006.01) |

(52) U.S. Cl.
CPC ............ *D21H 17/455* (2013.01); *C08F 8/28* (2013.01); *D21H 17/375* (2013.01); *D21H 17/54* (2013.01); *D21H 17/56* (2013.01); *D21H 17/72* (2013.01); *D21H 21/10* (2013.01); *D21H 21/18* (2013.01); *C08F 2800/10* (2013.01)

(58) Field of Classification Search
None
See application file for complete search history.

(56) References Cited

U.S. PATENT DOCUMENTS

| 5,393,381 | A | * | 2/1995 | Hund | ................... D21H 17/375 |
| | | | | | 162/168.3 |
| 7,589,153 | B2 | | 9/2009 | Hagiopol et al. |
| 8,734,616 | B2 | | 5/2014 | Hund et al. |
| 2006/0270801 | A1 | | 11/2006 | Hagiopol et al. |
| 2008/0149287 | A1 | * | 6/2008 | Hagiopol | ................ C08F 20/56 |
| | | | | | 162/164.6 |
| 2009/0165978 | A1 | | 7/2009 | Hagiopol et al. |
| 2011/0056640 | A1 | | 3/2011 | Cyr et al. |
| 2015/0136348 | A1 | | 5/2015 | Hund et al. |

FOREIGN PATENT DOCUMENTS

| JP | 09228295 A | 9/1997 |
| WO | 2005072185 A2 | 8/2005 |
| WO | 2007041380 A1 | 4/2007 |
| WO | 2010059946 A1 | 5/2010 |
| WO | 2011015783 A1 | 2/2011 |
| WO | 2013128109 A1 | 9/2013 |

OTHER PUBLICATIONS

International Search Report for PCT/FR2013/050390 dated May 28, 2013.

* cited by examiner

*Primary Examiner* — Dennis R Cordray
(74) *Attorney, Agent, or Firm* — Heslin Rothenberg Farley & Mesiti P.C.

(57) ABSTRACT

Process for manufacturing a sheet of paper and/or of paperboard and the like, according to which, the cellulosic material is brought into contact with at least one dry strength aid, characterized in that said dry strength aid is a cationic or amphoteric (co)polymer derived from the reaction between at least one aldehyde and at least one base (co)polymer comprising at least one nonionic monomer, said base copolymer being modified with at least one polyfunctional compound comprising at least three heteroatoms chosen from N, S, O and P, in which at least three of these heteroatoms each have at least one mobile hydrogen.

16 Claims, No Drawings

PROCESS FOR MANUFACTURING PAPER USING A BASE COPOLYMER THAT HAS REACTED WITH AN ALDEHYDE AS A DRY STRENGTH, RETENTION, DRAINAGE AND RUNNABILITY AID

CROSS REFERENCE TO RELATED APPLICATIONS

This application is a continuation of U.S. application Ser. No. 14/373,069, filed on Jul. 18, 2014, which is a national stage filing under section 371 of International Application No. PCT/FR2013/050390, filed on Feb. 26, 2013, and published on Sep. 6, 2013 as WO 2013/128109 A1, and claims priority to French Application No. 1251740 filed on Feb. 27, 2012. The entire disclosures of each of the prior applications are hereby incorporated herein by reference.

The invention relates to a novel process for manufacturing paper using, as dry strength, retention, drainage and runnability aid, a product derived from the reaction between at least one aldehyde and at least one cationic or amphoteric base (co)polymer, said copolymer comprising acrylamide or derivative and incorporating, at its very heart, at least one polyfunctional compound comprising at least three heteroatoms, in which at least three of these heteroatoms each have at least one mobile hydrogen.

Document WO 2011/15783 by the applicant describes polymers obtained by Hofmann degradation reaction on a base (co)polymer. The base copolymer contains a polyfunctional compound incorporated during the polymerization of the base (co)polymer. These compounds are used in the manufacture of paper as a flocculation, retention and/or drainage aid.

Document US 2011/0056640 describes a process for manufacturing paper using a compound derived from the reaction between an aldehyde and an acrylamide/diallyldimethylammonium chloride copolymer. This process only improves the drainage.

The document WO2010/059946 and US2006/0270801 describe a mixture of compounds to improve resistance of paper. Such mixtures include a glyoxalated polymer, and optionally a polyfunctional compound.

Document WO2005/072185 describes a method of paper making using polymer which have reacted with an aldehyde.

Document WO2007/041380 describes a wet strength agent consisting of a mixture of glyoxalated polymers.

The problem addressed by the invention is to develop a novel process for manufacturing paper in which both the drainage properties and the physical properties of the paper are improved.

DESCRIPTION OF THE INVENTION

The applicant has found and developed a novel process for manufacturing a sheet of paper and/or card and the like, according to which, before or after formation of said sheet, the cellulosic material is brought into contact with at least one additive.

The process is characterized in that said additive is a cationic or amphoteric (co)polymer derived from the reaction between at least one aldehyde and at least one base (co)polymer comprising at least one nonionic monomer selected from the group consisting of acrylamide (and/or methacryl amide), N,N-dimethylacrylamide, and/or acrylonitrile, said base copolymer being modified beforehand with at least one polyfunctional compound comprising at least three heteroatoms chosen from N, S, O and P, in which at least three of these heteroatoms each have at least one mobile hydrogen.

In the remainder of the description and in the claims, the following definitions apply:
additive denotes an aid that is simultaneously a dry strength aid, a retention aid, a drainage aid and a runnability aid,
base (co)polymer denotes the (co)polymer before the reaction with the aldehyde compound,
final (co)polymer denotes the product derived from the reaction between the aldehyde compound and the base (co)polymer.

According to the invention, the modification of the base (co)polymer with at least one additional polyfunctional compound consists either in incorporating the additional polyfunctional compound(s) before or during the polymerization of the constituent comonomers of the base (co) polymer, or in grafting the additional polyfunctional compound(s) to the base (co)polymer.

Advantageously, when the polyfunctional compound is incorporated prior to or during the polymerization process, it does not react with the non-ionic monomer selected from the group comprising acrylamide (and/or methacrylamide), N, N dimethylacrylamide, and/or acrylonitrile. Indeed, the nonionic monomer is added into the reaction medium under the polymerization conditions.

The polyfunctional compounds may be: oligomers, polymers, or carbon-based chains comprising at least three carbon atoms.

The polyfunctional compound may be a polymer derived from "template" polymerization. These are polymers into which, during their synthesis, a low molecular weight polymer that will absorb one of the monomers taking part in the polymerization is introduced.

In particular, the polyfunctional compounds referred to as additional polyfunctional compounds are selected from the group consisting of polyethyleneimines (PEI), polyamines (primary and secondary), polyallylamines, polythiols, polyalcohols, polyamide-epichlorohydrin (PAE) resins and polyamine amides (PAA).

The final cationic or amphoteric (co)polymer therefore comprises at least one nonionic monomer selected from the group consisting of acrylamide (and/or methacrylamide), N,N-dimethylacrylamide, and/or acrylonitrile, and is modified, prior to the reaction with an aldehyde compound, by at least one additional polymer selected from the group consisting of polyethyleneimine, polyamine (primary or secondary), polyallylamine, polythiols, polyalcohols, polyamide-epichlorohydrin (PAE) resins and polyamine amides (PAA).

In one preferred embodiment, the polyfunctional compound incorporated is selected from the group consisting of polyethyleneimine (PEI) and polyamine amide (PAA).

In practice, the base (co)polymer contains at least 100 ppm of polyfunctional polymer, preferably at least 500 ppm, more advantageously at least 1000 ppm.

Advantageously, the aldehyde could be selected from the group consisting of glyoxal, glutaraldehyde, furandialdehyde, 2-hydroxyadipaldehyde, succinaldehyde, dialdehyde starch, 2,2-dimethoxyethanal, diepoxy compounds, and combinations thereof. Preferably the aldehyde compound will be glyoxal.

According to one preferred feature of the invention, the base (co)polymer is branched by means of a radical branching agent. In this case, the copolymer obtained is reacted with glyoxal.

The branching will preferably be carried out during the polymerization of the base copolymer, in the presence of a polyfunctional radical branching agent and optionally a transfer agent. Below is a nonlimiting list of branching agents: methylenebisacrylamide (MBA), ethylene glycol diacrylate, polyethylene glycol dimethacrylate, diacrylamide, cyanomethyl acrylate, vinyloxyethyl acrylate or methacrylate and triallylamine.

In practice, the branching agent is advantageously introduced in a proportion of five to fifty thousand (5 to 50 000) parts per million by weight relative to the active material, preferably 5 to 10 000, advantageously 5 to 5000 parts per million by weight. Advantageously, the branching agent is methylenebisacrylamide (MBA).

Below is a nonlimiting list of transfer agents: isopropyl alcohol, sodium hypophosphite, mercaptoethanol, etc.

The process will be successfully used for the manufacture of packing papers and paperboards, coating base papers, sanitary and domestic papers, and any type of papers, paperboards or the like requiring the use of a polymer as a dry strength, retention, drainage and runnability aid.

The term "runnability" denotes the optimization of the operation of the papermaking machine by increasing the productivity via better drainage through the table, better dryness in the press section, a reduction in breaks through a greater cleanliness of the circuits and a reduction in deposits.

The process furthermore makes it possible to obtain good drainage properties and good physical properties (improvement in burst, breaking length, ring crush test, short span compression test, concora medium test, internal cohesion, wet breaking length).

Likewise, the final cationic or amphoteric copolymer used in the process of the invention has a cationic charge density preferably of greater than 0.4 meq/g and advantageously of greater than 1.25 meq/g.

In practice, the cationic or amphoteric (co)polymer is derived from the reaction between:
from 1 to 30 wt % of at least one aldehyde preferably selected from the group consisting of glyoxal, glutaraldehyde, furandialdehyde, 2-hydroxyadipaldehyde, succinaldehyde, di aldehyde starch, 2,2-dimethoxyethanal, diepoxy compounds, and combinations thereof,
with at least one base (co)polymer optionally branched by means of a radical branching agent and containing:
    at least 5 mol % of a nonionic monomer selected from the group consisting of acrylamide (and/or methacrylamide), N,N-dimethylacrylamide, and/or acrylonitrile, preferably acrylamide,
    at least 100 ppm of at least one additional polyfunctional compound selected from the group consisting of polyethyleneimine, polyamine (primary or secondary), polyallylamine, polythiols, polyalcohols, polyamide-epichlorohydrin (PAE) resins and polyamine amides (PAA), advantageously polyethyleneimine,
    optionally at least:
        one unsaturated cationic ethylenic monomer, preferably selected from the group consisting of monomers of dialkylaminoalkyl (meth)acrylamide, diallylamine and methyldiallylamine type and the quaternary ammonium or acid salts thereof. Mention will in particular be made of diallyldimethylammonium chloride (DADMAC), acrylamidopropyltrimethylammonium chloride (APTAC) and/or methacrylamidopropyltrimethyl ammonium chloride (MAPTAC),
        and/or a nonionic monomer preferably selected from the group consisting of N-vinyl acetamide, N-vinyl formamide, N-vinylpyrrolidone and/or vinyl acetate,
        and/or an anionic monomer of acid or anhydride type selected from the group consisting of (meth)acrylic acid, acrylamidomethylpropylsulphonic acid, itaconic acid, maleic anhydride, maleic acid, methallylsulphonic acid, vinylsulphonic acid and salts thereof.

Advantageously, the final cationic or amphoteric (co)polymer is derived from the reaction preferably between:
15 to 25 wt % of glyoxal,
a base (co)polymer branched by means of a radical branching agent and comprising:
    at least 5 mol % of acrylamide,
    at least 100 ppm of polyethyleneimine,
    5 to 50 mol % of at least one unsaturated cationic ethylenic comonomer, selected from the group consisting of monomers of dialkylaminoalkyl (meth)acrylamide, diallylamine and methyldiallylamine type and the quaternary ammonium or acid salts thereof, preferably diallyldimethylammonium chloride,
    at least 100 ppm of a radical branching agent.

It should be noted that, in combination with these monomers, it is also possible to use monomers that are insoluble in water, such as acrylic, allyl or vinyl monomers comprising a hydrophobic group. During the use thereof, these monomers will be employed in very small amounts, of less than 20 mol %, preferably less than 10 mol %, and they will preferably be selected from the group consisting of acrylamide derivatives such as N-alkylacrylamides, for example N-tert-butylacrylamide and octylacrylamide, and also N,N-dialkylacrylamides such as N,N-dihexylacrylamide, and acrylic acid derivatives such as alkyl acrylates and methacrylates.

According to a preferred embodiment, the base copolymer used in the invention is a copolymer of a nonionic monomer and a cationic monomer.

The incorporation of the additional polyfunctional compound that modifies the structure of the base (co)polymer could be carried out in the reaction medium before or during the polymerization, or by any other method of grafting to the finished base copolymer. Advantageously, the polyfunctional compound does not react with the monomers before their polymerisation.

Preferably, the additional polyfunctional compound will be mixed with a comonomer before polymerization.

Advantageously, during the process, the amount of final (co)polymer introduced into the fibre suspension is between 500 and 4000 grams of active polymer per tonne of dry pulp (g/t). Preferably, the amount introduced is between 1000 g/t and 3000 g/t.

The base (co)polymer does not require the development of a particular polymerization process. The principal polymerization techniques, well known to a person skilled in the art, and which may be used are: precipitation polymerization, emulsion (aqueous or inverse) polymerization, which may or may not be followed by a distillation and/or spray-drying step, and suspension polymerization or solution polymerization, these two techniques being preferred.

Glyoxalation does not require a particular method. The principal glyoxalation techniques known to a person skilled in the art can be used. For example, the pH could be adjusted after addition of glyoxal with a solution of sodium hydroxide. It is also possible to conduct the reaction at a pH that is controlled by a continuous addition of sodium hydroxide, but also to add the glyoxal in several fractions. The progress of the reaction could also be monitored by measuring the viscosity, turbidity, etc.

According to the invention, the additive is added to the process before or after formation of the sheet. Thus, the cellulosic material can be brought into contact with the additive in various ways. The final (co)polymer could be used in the form of a diluted or undiluted aqueous solution. It will be added to the cellulosic material. It could be applied by an impregnation technique or could be directly added to the fibre suspension at any point of the paper manufacturing process where dry strength aids are customarily introduced.

It could be introduced into the thick stock or into the thin stock. It could be added at the fan pump or headbox. Preferably, the (co)polymer will be introduced before the headbox.

It could also be added at the wire end or size press, for example by spraying.

The incorporation or application of the final (co)polymer will be carried out with conventional means known to person skilled in the art.

Preferably, the final (co)polymer is injected industrially into the fibre suspension, i.e. before the dilution thereof by the white waters (thick stock). The concentrations of the stock or pulp are of the order of 3% and 5%.

The process could be used with virgin fibre (Kraft, bisulfite, etc.) stocks or pulps or recycled fibre stocks or pulps, deinked stocks or pulps, mechanical stocks or pulps and thermomechanical stocks or pulps.

The final (co)polymer could be prepared in the vicinity of the papermaking machine.

The invention and the advantages that result therefrom emerge clearly from the following exemplary embodiments.

Exemplary Embodiments

Protocol for the Synthesis of the Compound of the Invention
Synthesis of Modified Base (Co)Polymer with PEI During Polymerization The polymers of the invention identified from polymers 1 to 17 were obtained from a modified base copolymer with PEI during polymerization according to the following protocol.

The examples were carried out with an acrylamide/diallyldimethylammonium chloride (DADMAC) copolymer, branched with MBA (1000 ppm/active material), modified with a polyethyleneimine polymer (of Polymin HM type by BASF), in a proportion of 1% with respect to the active material. In order to do this, the polyethyleneimine is mixed with the DADMAC monomer and with the MBA in the reactor. The acrylamide will be incorporated by dripping continuously, over 2 h, into a reaction medium maintained at 85° C. The catalysis will take place with SPS and MBS, catalysts that are well known to a person skilled in the art.
Synthesis of the Base (Co)Polymer with Post-Grafting of PEI In the case of the post-grafting of the (co)polymer, the examples (polymers 19 and 20) were carried out in the same way as above, except for the difference that the polyethyleneimine is not mixed with a monomer in the reactor. In order to do this, the polyethyleneimine is added to the reactor after the polymerization in a proportion of 1% with respect to the active material. The grafting takes place by catalysis with the aid of 1500 ppm of SPS dripping continuously over 1 h 30 min.

Glyoxalation

Introduced into a 600 ml stirred reactor are 154.3 g of base copolymer (20% concentration, 3800 cps) and 626.6 g of demineralised water. The reactor is equipped with a pH measurement probe. After stirring for 10 minutes, the pH is adjusted to 10.5 with a 10% sodium hydroxide solution. The temperature is maintained between 24° C. and 26° C.

19.0 g of 40% glyoxal are added. The pH value is 8.75. Controlling the pH and monitoring the viscosity make it possible to obtain a product of 52 cps after 65 minutes of reaction. When the desired viscosity is achieved, the reaction is stopped by lowering the pH to less than 3.5 by addition of 92% $H_2SO_4$.

The pH may be adjusted after addition of glyoxal with a 10% sodium hydroxide solution. It is possible to carry out the reaction at a pH that is controlled by continuous addition of 10% sodium hydroxide, but also to add the glyoxal in several fractions.

The viscometer used is of Brookfield type, with an LV1 spindle and a speed of 60 rpm.
Pulp Preparation The pulp used consists of recycled paperboard fibres. The paper pulp is prepared by disintegrating, over 30 minutes, 90 grams of recycled fibres in 2 liters of hot water. The Shopper degree of the pulp thus obtained is 43. The tests are carried out with the pulp at neutral pH. The pulp obtained is then diluted to a total volume of 9 liters. Once the consistency has been accurately measured, the required amount of this pulp is withdrawn so as to obtain, in the end, a sheet with a basis weight of 120 $g/m^2$.
Test of the Polymer Properties
A/ Drainage Performances CSF sequence at 1000 rpm (revolutions per minute):
Use of a static handsheet former for stirring the pulp.
Introduction of 1 liter of 0.3% pulp.
T=0 s: stirring of the pulp.
T=10 s: addition of polymer.
T=30 s: cessation of stirring and recovery of the liter of pulp.
Implementation of the TAPPI T 227OM-94 test.
CSF: measure of the degree of "drainability" of the pulp
B/ Performances in DSR (Dry Strength) Application, Basis Weight at 60 $g/m^2$ 1/ Sheet Formation The paper handsheets are produced with an automatic dynamic handsheet former. The pulp is introduced into the chest of the dynamic handsheet former, diluted to a consistency of 0.32% and gently stirred with a mechanical stirrer in order to homogenize the fibre suspension. In manual mode, the pulp is pumped up to the level of the nozzle in order to prime the circuit. A blotting paper and the forming fabric are placed in the drum of the dynamic handsheet former before starting the rotation of the drum at 900 m/min and constructing the water wall. The final copolymer is then introduced into the agitated fibre suspension with a contact time of 30 seconds. The sheet is then produced (in automatic mode) by 22 to-and-fro movements of the nozzle spraying the pulp into the water wall. Once the water is drained and once the automatic sequence is completed, the forming fabric with the network of fibres formed is removed from the drum of the dynamic handsheet former and placed on a table. A dry blotting paper is placed on the side of the mat of wet fibres and is pressed once with a roller. The assembly is turned over and the fabric is carefully separated from the fibrous mat. A second dry blotting paper is placed and the sheet (between the two blotting papers) is pressed once under a press delivering 4 bar and is then dried on a stretched dryer for 9 min at 107° C. The two blotting papers are subsequently removed and the sheet is stored overnight in a chamber with controlled humidity and controlled temperature (50% relative humidity and 23° C.). The dry strength properties of all of the sheets obtained via this procedure are then evaluated.

2/ Bursting Test

The burst index is measured with a Messmer Buchel M 405 bursting strength tester (average over 14 measurements). The test is carried out according to the standard TAPPI T403 OM 91

3/ Dry Tensile Strength Test

The breaking length is measured using a Testometric AXM250 tensile testing machine. The test is carried out according to the standard TAPPI 494 OM 88.

Modified base (co)polymer with PEI during polymerization

In all the examples that follow, and unless otherwise indicated, the sheets of paper are produced according to the above procedure by introducing the final copolymer at a dosage of 2.5 kg/T (dry polymer/dry fibre).

TABLE 1 characteristics and results of the tests of the high viscosity polymers

| | | | | | | Dosage: 1.5 kg/T | | | Dosage: 2.5 kg/T | | |
|---|---|---|---|---|---|---|---|---|---|---|---|
| Polymers | Base cationicity (mol %) | Base viscosity (cPs) | Glyoxalated product viscosity (cPs) | MBA (ppm/ MA base) | PEI (ppm/ MA base) | CSF (ml) | Burst index | Dry tensile strength (km) | CSF (ml) | Burst index | Dry tensile strength (km) |
| Blank | | | | | | 270 | 1.99 | 3.82 | 270 | 1.99 | 3.82 |
| Polymer 2 | 15% | 3700 | 50.5 | 0 | 0 | 420 | 2.28 | 4.24 | 488 | 2.56 | 4.71 |
| Polymer 3 | 15% | 3250 | 52.0 | 1000 | 0 | 431 | 2.25 | 4.12 | 495 | 2.27 | 4.40 |
| Polymer 4 (invention) | 15% | 3800 | 53.0 | 1000 | 1000 | 440 | 2.32 | 4.65 | 504 | 2.58 | 4.77 |

The branching alone of the glyoxalated and PEI-free base copolymer (polymer 3) makes it possible to obtain an improvement in the drainage properties but is prejudicial to the improvement in the physical properties. The process of the invention itself makes it possible to obtain an improvement in the drainage that is greater than the other products while retaining, or even while improving the physical properties in the dry state.

TABLE 2 characteristics and results of the tests of the low viscosity polymers

| Polymers | Base cationicity (mol %) | Base viscosity (cPs) | Glyoxalated product viscosity (cPs) | MBA (ppm/ MA base) | PEI (ppm/ MA base) | CSF (ml) | Burst index | Breaking length (km) |
|---|---|---|---|---|---|---|---|---|
| Blank | | | | | | 272 | 1.69 | 3.28 |
| Polymer 5 | 15% | 485 | 51.5 | 0 | 0 | 465 | 2.29 | 4.89 |
| Polymer 6 | 15% | 720 | 52.0 | 1000 | 0 | 468 | 2.23 | 4.82 |
| Poly's mer 7 (invention) | 15% | 500 | 49.0 | 1000 | 1000 | 489 | 2.32 | 4.97 |
| Polymer 8a | 15% | 485 | 49.0 | 0 | 1000* | 454 | 2.27 | 4.90 |
| Polymer 8b | 15% | 485 | 49.5 | 0 | 1000** | 453 | 2.25 | 4.85 |

1000* PEI added to the copolymer that has reacted with the aldehyde compound.

1000** PEI added to the copolymer before reaction with the aldehyde compound. It is not a grafting requiring specific reaction conditions. The PEI is simply mixed with the copolymer.

This second series of tests demonstrates that the tendency to improve the results remains identical during the use of base copolymers of lower viscosity (polymers 5 and 6). The results obtained with polymer 8a and 8b are inferior to those of the polymer of the invention. These results demonstrate the importance of the presence of PEI during the polymerization of the base copolymer and its incorporation into the structure of the base copolymer.

TABLE 3 characteristics and results of the tests of the polymers of the invention with an increase in cationicity.

| Polymers | Base cationicity (mol %) | Base viscosity (cPs) | Glyoxalated product viscosity (cPs) | MBA (ppm/ MA base) | PEI (ppm/ MA base) | CSF | Burst index | Breaking length (km) |
|---|---|---|---|---|---|---|---|---|
| Blank | | | | | | 277 | 1.82 | 3.90 |
| Polymer 9 | 5% | 2050 | 43.5 | 0 | 0 | 341 | 2.14 | 4.53 |
| Polymer 10 | 5% | 1200 | 50.5 | 1000 | 1000 | 355 | 2.17 | 4.73 |
| Polymer 11 | 15% | 3800 | 53.0 | 1000 | 1000 | 445 | 2.36 | 4.95 |
| Polymer 12 | 30% | 4200 | 50.5 | 1000 | 1000 | 449 | 2.46 | 4.86 |
| Polymer 13 | 30% | 3850 | 51.5 | 0 | 0 | 430 | 2.32 | 4.72 |
| Polymer 14 | 40% | 1600 | 48.5 | 1000 | 1000 | 448 | 2.38 | 4.73 |

The above table shows the change in the results with respect to the increase in the cationicity of the base polymer. The polymers of the invention are all better than polymer 9.

By comparing the performances of polymers 9 and 10 having the same cationicity, it is surprisingly observed that with a lower molecular weight within the context of the invention (polymer 10), it is possible to obtain better drainage and dry strength results.

With a similar molecular weight (base copolymer), polymers 10 and 14 have different performances. Polymer 14, which has a cationicity of 40 mol %, gives superior results, whether it be in terms of drainage or burst index, than polymer 10 (5 mol % cationicity).

It should be noted that the benefit of the invention applies irrespective of the cationicity of the product. Indeed, by comparing polymers 12 and 13, both of the same cationicity (30 mol %), it is observed that the polymer of the invention (polymer 12) gives better drainage and physical property performances.

| Polymers | Base cationicity (mol %) | Glyoxalated product viscosity (cPs) | MBA (ppm/ MA base) | PEI (ppm/ MA base) | CSF | Burst index | Breaking length (km) |
|---|---|---|---|---|---|---|---|
| Blank | | | | | 272.00 | 1.69 | 3.28 |
| Polymer 15 | 30% | 42.0 | 1000 | 1000 | 451 | 2.34 | 5.01 |
| Polymer 16 | 30% | 53.0 | 1000 | 1000 | 540 | 2.19 | 4.42 |
| Polymer 17 | 30% | 32.0 | 0 | 0 | 428 | 2.16 | 4.10 |

Polymer 17 corresponds to example 7 from patent US 2011/0056640 which has been reproduced then tested.

| Polymers | Base cationicity (mol %) | Base viscosity (cPs) | Glyoxalated product viscosity (cPs) | MBA (ppm/MA base) | PEI (ppm/MA base) | Dosage 2 kg/T CSF (ml) | Dosage: 2.5 kg/T CSF (ml) |
|---|---|---|---|---|---|---|---|
| Polymer 18 | 22% | 1200 | 125 | 1000 | 0 | 453 | 421 |
| Polymer 19 | 22% | 1200 | 125 | 1000 | 1000 | 462 | 432 |
| Polymer 20 | 22% | 1200 | 120 | 1000 | 0 | 441 | 407 |

The table above shows that two polymers (polymers 15 and 16) derived from the invention, glyoxalated at two different viscosities, have properties that are superior to polymer 17, of the same cationicity.

In Case of Base (Co)Polymer Modified with Post-Grafting of PEI

Polymers 19 and 20 were made by post-grafting the base (co)polymer with PEI. Specifically, the polymerization of acrylamide and DADMAC in the presence of MBA is performed. The obtained polymer is then separated into three fractions.

The first fraction reacts with glyoxal as described above: Sample 18.

In the second fraction, the initiator (SPS) and PEI is added by continuous casting for 90 minutes at the temperature of 80° C., in order to post-graft the PEI. This sample has been glyoxalated according to the standard process: Sample 19.

The third fraction was treated in the same manner as the sample 19, but without adding PEI. The aim is to assess the impact of continuous adding of SPS. The glyoxalation is identical to the Examples 18 and 19.

The results (draining by CSF) show again a performance when polymer 18 (base polymer without PEI) is compared to polymer 19 (base post-grafted PEI). Polymer 20 has inferior performance compared to polymer 18, with the indication of a degradation when the SPS is added during 90 minutes at the temperature of 80° C. It is therefore concluded that it is the post-grafting of the PEI which brings this gain of performance.

The invention claimed is:
1. A process for manufacturing a sheet of paper and/or of paperboard, said process comprising:
before or after formation of said sheet, bringing cellulosic material into contact with at least one additive, wherein said additive is a cationic or amphoteric (co)polymer derived from the reaction between at least one aldehyde and at least one base (co)polymer comprising at least one nonionic monomer selected from the group consisting of acrylamide, methacrylamide, N,N-dimethylacrylamide, and acrylonitrile, said base copolymer being modified, prior to the reaction with the at least one aldehyde, with at least one polyfunctional compound comprising at least three heteroatoms chosen from N, S, O and P, in which at least three of these heteroatoms each have at least one mobile hydrogen,
wherein the base (co)polymer is modified with at least one polyfunctional compound either by incorporation of the at least one polyfunctional compound(s) before or during polymerization of the constituent comonomers of the base (co)polymer, or by grafting of the at least one polyfunctional compound(s) to the base (co)polymer,
wherein the base (co)polymer, prior to the reaction with the at least one aldehyde, is modified in the absence of glyoxal,
wherein the polyfunctional compound(s) are selected from the group consisting of polyethyleneimines, primary polyamines, secondary polyamines, polyallylamines, polythiols, polyalcohols, polyamide-epichlorohydrin resins and polyamine amides, and
wherein the aldehyde is selected from the group consisting of glyoxal, glutaraldehyde furandialdehyde, 2-hydroxyadipaldehyde, succinaldehyde, dialdehyde starch, 2,2-dimethoxyethanal, diepoxy compounds, and combinations thereof.

2. The process according to claim 1, wherein the polyfunctional compound is selected from the group consisting of polyethyleneimine and polyamine amide.

3. The process according to claim 2, wherein the base copolymer is branched in the presence of a radical branching agent.

4. The process according to claim 3, wherein the radical branching agent is selected from the group consisting of methylenebisacrylamide, ethylene glycol diacrylate, polyethylene glycol dimethacrylate, diacrylamide, cyanomethyl acrylate, vinyloxyethyl acrylate or methacrylate, and triallylamine.

5. The process according to claim 2, wherein the aldehyde is glyoxal.

6. The process according to claim 1, wherein the base copolymer is branched in the presence of a radical branching agent.

7. The process according to claim 6, wherein the aldehyde is glyoxal.

8. The process according to claim 6, wherein the radical branching agent is selected from the group consisting of methylenebisacrylamide, ethylene glycol diacrylate, polyethylene glycol dimethacrylate, diacrylamide, cyanomethyl acrylate, vinyloxyethyl acrylate or methacrylate, and triallylamine.

9. The process according to claim 8, wherein the final cationic or amphoteric (co)polymer is derived from a reaction between:
15 to 25 wt % of glyoxal,
a base (co)polymer branched by means of a radical branching agent and comprising:
at least 5 mol % of acrylamide,
at least 100 ppm of polyethyleneimine,
5 to 50 mol % of at least one unsaturated cationic ethylenic comonomer, selected from the group consisting of monomers of dialkylaminoalkyl (meth)acrylamide, diallylamine and methyldiallylamine type and the quaternary ammonium or acid salts thereof, and
at least 100 ppm of a radical branching agent.

10. The process according to claim 1, wherein the aldehyde is glyoxal.

11. The process according to claim 1, wherein the cationic or amphoteric (co)polymer is derived from the reaction between:
from 1 to 30 wt % of at least one aldehyde selected from the group consisting of glyoxal, glutaraldehyde, furandialdehyde, 2-hydroxyadipaldehyde, succinaldehyde, dialdehyde starch, 2,2-dimethoxyethanal, diepoxy compounds, and combinations thereof,
with at least one base (co)polymer optionally branched by means of a radical branching agent and containing:
at least 5 mol % of a nonionic monomer selected from the group consisting of acrylamide, methacrylamide, N,N-dimethylacrylamide, and/or acrylonitrile,
at least 100 ppm of at least one polyfunctional compound selected from the group consisting of polyethyleneimine, primary polyamines, secondary polyamines polyallylamine, polythiols, polyalcohols, polyamide-epichlorohydrin resins and polyamine amides,
optionally at least:
one unsaturated cationic ethylenic monomer, selected from the group consisting of monomers of dialkylaminoalkyl (meth)acrylamide, diallylamine and methyldiallylamine type and the quaternary ammonium or acid salts thereof,
and/or a nonionic monomer selected from the group consisting of N-vinyl acetamide, N-vinyl formamide, N-vinylpyrrolidone and/or vinyl acetate,
and/or an anionic monomer of acid or anhydride type selected from the group consisting of (meth)acrylic acid, acrylamidomethylpropylsulphonic acid, itaconic acid, maleic anhydride, maleic acid, methallylsulphonic acid, vinyl sulphonic acid and salts thereof.

12. The process according to claim 11, wherein the at least one additional polyfunctional compound includes polyethyleneimine.

13. The process according to claim 11, wherein the optional at least one unsaturated cationic ethylenic monomer is selected from the group consisting of diallyldimethylammonium chloride, acrylamidopropyltrimethylammonium chloride, and methacrylamidopropyltrimethylammonium chloride.

14. The process according to claim 13, wherein the at least one additional polyfunctional compound is selected from the group consisting of polyethyleneimine and polyamine amide.

15. The process according to claim 1, wherein the final cationic or amphoteric (co)polymer is derived from reaction between:
15 to 25 wt % of glyoxal,
a base (co)polymer branched by means of a radical branching agent and comprising:
at least 5 mol % of acrylamide,
at least 100 ppm of polyethyleneimine, 5 to 50 mol % of at least one unsaturated cationic ethylenic comonomer, selected from the group consisting of monomers of dialkylaminoalkyl (meth) acrylamide, diallylamine and methyldiallylamine type and the quaternary ammonium or acid salts thereof, and at least 100 ppm of a radical branching agent.

16. The process according to claim 15, wherein the at least one unsaturated cationic ethylenic comonomer includes diallyldimethylammonium chloride.

* * * * *